Fig. 1

Patented May 18, 1954

2,678,957

UNITED STATES PATENT OFFICE 2,678,957

POLYMERIZATION OF OLEFINIC HYDROCARBONS

Celeste M. Fontana, Pitman, and Robert J. Herold, Wenonah, N. J., assignors to Socony-Vacuum Oil Company, Incorporated, a corporation of New York Application January 30, 1951, Serial No. 208,638

18 Claims. (Cl. 260—683.15)

This invention relates to the polymerization of olefinic hydrocarbons and is more particularly concerned with the catalytic polymerization of 1-olefins. More specifically, the present invention has to do with the production of new polymers of monoalkylethylenes which are highly viscous and useful as addition agents for admixture with mineral lubricating oils.

As is well known to those familiar with the art, olefinic hydrocarbons have been polymerized to produce polymer products ranging in viscosities from those of very light liquids and heavier, which are suitable for use as lubricating oils, up to those of rubbery semi-solids. The polymerization reactions have been carried out using catalysts of the Friedel-Crafts type, such as aluminum chloride, aluminum monochlorodibromide, aluminum bromide and boron fluoride, dissolved, particularly where the catalyst is a solid, in a catalyst solvent which is unreactive under the conditions of polymerization. Typical of these catalyst solvents are the alkyl halides, such as ethyl chloride, methyl bromide, isopropyl chloride, tetrachloroethane and chloroform, hydrocarbons and mixtures thereof, such as cyclobutane, pentane, isobutane and kerosene, and even carbon disulphide. In some cases, the Friedel-Crafts catalyst has been used in conjunction with a hydrogen halide, for example, hydrogen chloride and hydrogen bromide, as a catalyst promoter for the purpose of activating the catalyst and to function as a coadjutor in the polymerization reaction.

In accordance with the prior art, the olefinic hydrocarbons which have been subjected to the polymerization operations referred to hereinbefore have been branched-chain olefins, such as isobutylene and isoamylene. The products obtained from the polymerization of isobutylene, for example, have possessed sufficiently high viscosities to make them useful as addition agents for admixture with mineral lubricating oils for the purpose of improving the viscosity indices thereof. Monoalkylethylenes, such as propylene, and normal butene-1, have been polymerized also. However, all attempts of the prior art to produce highly viscous polymers from monoalkylethylenes such as propylene and normal butene-1, for use as addition agents for admixture with mineral lubricating oils to improve the viscosity indices thereof, have been unsuccessful.

In U. S. patents to Fontana, Oblad and Kidder, No. 2,525,787, issued October 17, 1950; to Fontana and Kidder, No. 2,525,788, issued October 17, 1950; and in a copending application by Fontana, Serial No. 72,138, filed January 22, 1949, now Patent No. 2,571,354, issued on October 16, 1951, there have been disclosed processes for obtaining highly viscous polymers of monoalkylethylenes, such as propylene and normal butene-1. In accordance with these processes, the highly viscous polymers of monoalkylethylenes are produced by effecting the polymerization in the presence of aluminum bromide and of hydrogen bromide and through the concurrent use of specified molar ratios of catalyst promoter to dissolved aluminum catalyst and of specified rates of addition of olefin reactant with respect to dissolved aluminum bromide catalyst.

The monoalkylethylene polymer products obtained in accordance with the processes disclosed and claimed in the patents and in the copending application for patent, referred to hereinbefore, are so different from the monoalkylethylene polymers of the prior art and possess such unusual characteristics that, for the purposes of distinguishing and defining over the products of the prior art, the patentees and the applicant have had recourse to the concept of thickening power and relative thickening power. Inded, this concept is essential since, at high viscosities, the concepts of viscosity and of viscosity index are inept due to the difficulty or impossibility of measuring viscosities directly. Accordingly, the thickening power has been defined as:

$$TP = \frac{100}{\text{percent polymer in blend}} \log_{10} \frac{\text{kinematic viscosity of oil blend}}{\text{kinematic viscosity of base oil}}$$

wherein:

$TP$=the thickening power;

Per cent polymer in blend=the per cent by weight of the polymer blended with a base stock lubricating oil;

Kinematic viscosity of oil blend=the viscosity in centistokes of the blend of base stock lubricating oil and polymer; and Kinematic viscosity of base oil=the viscosity in centistokes of the base stock lubricating oil.

When the viscosities of the blend and of the base stock are measured at 210° F., the thickening power has been indicate das $TP_{210}$; and when the viscosities are measured at 100° F., the thickening power has been indicated as $TP_{100}$. The relative thickening power (RTP) has been defined as the ratio:

$$RTP = \frac{TP_{210}}{TP_{100}}$$

The thickening power is closely related to intrinsic viscosity and is a measure of the molecular weight and viscosity of the polymer product. On the other hand, relative thickening power is closely related to viscosity index and is a measure of the change in viscosity with change in temperature. Therefore, it will be realized that those polymer products having the larger values of relative thickening power will be superior with respect to change in viscosity with change in temperature. Accordingly, the propylene polymer products obtained in the process set forth in U. S. Patent No. 2,525,787 have a $TP_{210}$ in excess of 3, the polymer products obtained in the process disclosed in U. S. Patent No. 2,525,788 have a $TP_{210}$ in excess of 5, while the propylene polymer products and n-butene-1 polymer products produced by the process described in application Serial No. 72,138, now Patent No. 2,571,354, issued on October 16, 1951, have $TP_{210}$'s in excess of 2.6 and in excess of 25, respectively.

All the processes set forth in these applications for patent effect the polymerization operation in the presence of aluminum bromide catalyst and of hydrogen bromide. Indeed, it was believed that in order to obtain the superior polymer products referred to, it was essential not only to utilize, concurrently, the specified molar ratios of promoter to catalyst and of specified rates of addition of olefin reactant with respect to dissolved catalyst, but, also to effect the polymerization reaction in the presence of aluminum bromide and of hydrogen bromide.

From the standpoint of process economics, the polymerization processes described in the copending applications referred to are relatively expensive in view of the high bromine-content of the catalyst-promoter system ($AlBr_3$+HBr). Therefore, any process that materially reduces the bromine-content of the catalyst-promoter system would be manifestly highly desirable.

It has now been found that in the processes referred to, it is possible to replace approximately one half of the bromine-content of the catalyst-promoter system with the appreciably less expensive chlorine, for example. It has now been discovered that, in the catalyst-promoter system of these processes, bromine may be replaced to the extent such that there will be present only two bromine atoms for each aluminum atom, without any appreciable deterioration in product quality.

Accordingly, it is an object of the present invention to provide an improved process for effecting the polymerization of monoalkylethylenes. It is another object to provide an improved catalytic process for effecting the polymerization of monalkylethylenes. It is another object to provide highly viscous polymers of monalkylethylenes. It is a very important object to provide an improved process for effecting the polymerization of relatively low-boiling monoalkylethylenes. It is a more specific object to provide highly viscous polymers of relatively low-boiling monoalkylethylenes. It is a further object to afford mineral lubricating oil compositions containing a minor proportion, sufficient to improve the viscosity indices thereof, of the polymers of monoalkylethylenes.

Other objects and advantages of the present invention will become apparent to those skilled in the art from the following description taken in conjunction with the following drawings in which.

Broadly stated, the present invention provides:

1. A process for effecting the polymerization of monoalkylethylenes, which comprises contacting a monoalkylethylene with an aluminum bromohalide catalyst dissolved in a non-polymerizable hydrocarbon solvent and selected from the group consisting of $AlBrX_2$ and $AlBr_2X$, wherein X is a halogen, in a polymerization reaction zone, in the presence of a halide promoter selected so that the sum of the bromine atoms present in the catalyst and promoter is equal to at least two but is less than 4, in proportions, such that, during the course of the reaction in the polymerization reaction zone, the mole ratio of promoter to dissolved aluminum bromohalide catalyst and the rate of addition of monoalkylethylene with respect to dissolved aluminum bromohalide catalyst will both vary between specified limits; and 2. The monoalkylethylene polymers obtained in accordance with the process defined in (1).

From the standpoint of the process contemplated herein, 1-olefins have been polymerized in the presence of aluminum bromide catalysts and a catalyst promoter, and isoolefins have been polymerized in the presence of aluminum bromohalide catalysts in the absence of catalyst promoters. However, in so far as is known, the processes of the prior art have never produced highly viscous polymer products from monoalkylethylenes, in view of the fact that the polymerization reactions effected in these processes have, in the first place, not been carried out under selected and correlated reaction conditions, and, in the second place, have involved an isoolefin and an aluminum bromohalide catalyst.

The monoalkylethylenes to be used herein are represented by the formula $R-CH=CH_2$, wherein R is an alkyl group. Propylene, butene-1, pentene-1, hexene-1, octene-1, decene-1, dodecene-1, and octadecene-1 may be mentioned by way of non-limiting examples. There appears to be no significant upper limit to the number of carbon atoms in the molecule of a monoalkylethylene utilizable in the process of the present invention. In practice, however, and for the purpose of producing highly viscous polymer products suitable as addition agents for mineral lubricating oils to improve the viscosity indices thereof, propylene and butene-1 are the preferred monalkylethylene reactants.

The monoalkylethylene reactants may be obtained from a variety of sources. Thus, propylene, butene-1 and pentene-1 may be obtained from $C_3$-, $C_4$-, and $C_5$-refinery streams. Higher molecular weight monoalkylethylenes may be obtained, suitably, by the dehydration of the corresponding alcohols or from the cracking of waxes or from Fischer-Tropsch fractions. Mixtures of monalkylethylenes may be used also, if desired, and these mixtures may contain saturated hydrocarbons. It is desirable, however, particularly when polymer products having relatively high thickening powers are to be obtained, to employ monoalkylethylene reactants substantially free of iso-paraffins, of 1-olefins having two alkyl groups on a carbon atom adjacent to the double bond, and of olefins other than 1-olefins, since the presence of these hydrocarbons tends to reduce the thickening power and the relative thickening power of the polymer products. Thus, for example, it has been found that isobutane, if present in propylene in amounts as small as 1.0% by volume, will reduce the thickening power of the product by as much as 25%.

Not included by the term monoalkylethylene but included by 1-olefins having two alkyl groups on a carbon atom adjacent to the double bond is isobutene. As stated hereinbefore, while isobutene may be polymerized through the processes of the prior art to produce polymer products having the necessary properties to improve the viscosity indices of mineral lubricating oils when added thereto, the process of the present invention, as applied to isobutene, does not produce polymer products having relatively high thickening powers, producing rather, light oils. On the other hand, when monoalkylethylenes are utilized in the processes of the prior art which produce high viscosity polymer products from isobutene, the polymer products likewise do not possess relatively high thickening powers, but, rather, are light oils.

In practicing the process contemplated herein, it is preferred to use a diluent for the monoalkylethylene reactant. In general, any hydrocarbon which is non-polymerizable under the conditions of reaction is utilizable for this purpose. Accordingly, the paraffinic hydrocarbons are eminently suited and, in view of what has been stated hereinbefore, the normal paraffins, are particularly well suited. Ethane, propane, normal butane, and mixtures thereof may be mentioned as the preferred diluents. The diluents, if employed, are used in the amounts utilized in the olefin polymerization processes of the prior art, i. e., from about 25% to about 75% by volume, based on the total monoalkylethylene-diluent charge.

The catalysts to be used in the process of the present invention are the hydrocarbon-soluble aluminum bromohalides. Mixtures of these catalysts can be used if desired. Indeed, these catalysts are known to occur as dimers, such as, for example, $Al_2Br_3Cl_3 = (AlBr_{1.5}Cl_{1.5})_2$, prepared from one mole of $AlBr_3$ and one mole of $AlCl_3$; or $AlBr_{2.8}Cl_{0.2}$, prepared from 0.2 mole $AlCl_3$ and 2.8 moles $AlBr_3$.

As stated hereinbefore, it is essential, for the purposes of this invention, to use a catalyst promoter in conjunction with the aluminum bromohalide catalyst. The promoters utilizable herein may be represented by the formula:

$$RY$$

wherein R is hydrogen or an alkyl group containing at least three carbon atoms, and Y is a halogen, which, in the case of the alkyl group, is attached, preferably, to a secondary carbon atom. Also as stated hereinbefore, it is likewise essential that the sum of the bromine atoms in the aluminum bromohalide catalyst-promoter system be equal to at least two but less than four for each atom of aluminum present therein. Accordingly, for the purposes of the present invention, the aluminum bromohalide-catalyst system can be defined by the following formula:

$$RalX_{2-n}Br_{2+n}$$

wherein R is hydrogen or an alkyl group containing at least three carbon atoms, X is a halogen other than bromine, and $n$ varies between 0 and less than 2. It will be seen, therefore, that the following aluminum bromohalide catalyst-promoter system will satisfy this formula as well as the mixtures referred to hereinbefore: Aluminum bromide-hydrogen chloride, aluminum bromide-isopropyl chloride, aluminum dibromochloride-secondary butyl chloride, aluminum dibromochloride-hydrogen iodide, aluminum dibromochloride-hydrogen bromide, aluminum dibromofluoride-hydrogen fluoride, and aluminum monobromoiodide-2-amyl bromide.

In the practice of the process of the present invention, it is preferred to use a solvent for the aluminum bromohalide catalyst. For this purpose, any hydrocarbon which is non-polymerizable under the conditions of reaction is utilizable. Hence, as with the diluent for the monoalkylethylene reactant, the paraffinic hydrocarbons are well suited and, in view of what has been stated hereinbefore, the normal paraffins are particularly well suited. Ethane, propane, normal butane and mixtures thereof may be mentioned as non-limiting examples.

The concentration of aluminum bromohalide catalyst in the catalyst-solvent mixture should be sufficiently high to catalyze the polymerization reaction. Obviously, the maximum concentration possible in any case will be determined by the solubility of the aluminum bromohalide catalyst, under the conditions of the polymerization reaction, in the particular solvent untilized. In practice, the preferred concentration, from the standpoint of commercial feasibility, has been found to vary between about 0.01 and about 1.5 mol per cent of catalyst based on the total non-polymerizing hydrocarbon solvent.

It will become apparent from the foregoing that one type of non-polymerizable hydrocarbon can be used as diluent for the monoalkylethylene reactant while another is used as catalyst solvent. If desired, a mixture of two or more hydrocarbons can be utilized as diluent and as solvent. It will be more convenient, however, to use the same non-polymerizable hydrocarbon as diluent and solvent. This is particularly desirable in large scale operations as the procedure of recovering the diluent and the solvent for reuse is thus appreciably simplified. In the case of low-temperature polymerization, on the other hand, it is frequently advantageous to use a catalyst solvent of moderate volatility, for example, normal butane, and a highly volatile diluent, such as ethane, capable of use for evaporative cooling, to control the temperature of the polymerization reaction.

The amounts of non-polymerizable hydrocarbon to be used as diluent and solvent are those which are employed in conventional olefin polymerization operations. Ordinarily, the amounts used in the process of the present invention vary between about three and about eight moles per mole of monoalkylethylene ractant.

In accordance with the present invention, in order to obtain polymer products having relatively high thickening powers, it is essential, during the polymerization reaction, to employ selected and correlated reaction conditions. Departure from concurrence and from the range of variation of each of these reaction conditions will result into polymer products possessing low thickening powers.

Thus, it is essential to control the molar ratio of catalyst promoter to aluminum bromohalide catalyst. This ratio, expressed in moles of catalyst promoter, measured as hydrogen halide, per mole of dissolved aluminum bromohalide catalyst varies, in the case of propylene, between about 0.2 and about 5.0, preferably, between about 0.5 and about 2.5; while in the case of the other monoalkylethylenes, it varies between about 0.05 and about 1.6, and, preferably, between about 0.08 and about 1.2. Indeed, the necessity for controlling this ratio renders the possible use of alkyl halides as catalyst solvents, as is well known in the art, substantially impossible.

Additionally and concurrently, it is essential to control the concentration of monoalkylethylene reactant in the reaction zone. This can be expressed, suitably, in terms of rate of addition of monoalkylethylene reactant to the reaction mixture containing diluent, promoter, aluminum bromohalide catalyst and solvent. In view of the fact that, as stated hereinbefore, the amount of aluminum bromohalide catalyst present in the reaction fixes the amount of promoter to be utilized, this condition can be defined, conveniently, as the moles of monoalkylethylene reactant to be added per mole of aluminum bromohalide catalyst present in the reaction zone, per minute. In the case of propylene, the rate, thus defined, must be not greater than about 2 moles of propylene per mole of catalyst per minute, preferably less than about one mole of propylene per mole of catalyst per minute. When the higher monoalkylethylenes are used, the rate must be not greater than about 4 moles per mole of catalyst per minute, and preferably, less than about 2.5 moles per mole of catalyst per minute.

From the foregoing, it will become apparent that the recitations of these concurrent and selected reaction conditions are dependent upon the amount of aluminum bromohalide catalyst utilized. Indeed, these conditions are defined, with certainty when the magnitude of the quantity of catalyst is specified. Suitably, the amounts of aluminum bromohalide catalyst to be used can be expressed on the basis of the molar ratio of monoalkylethylene reactant to catalyst. Accordingly, for the purposes of the present invention, the ratio must be in excess of 5 and, preferably, for achieving better utilization of catalyst, the ratio varies between about 10 and 160. The most satisfactory results, from the standpoint of thickening power of polymer product, have been obtained using ratios varying between about 20 and about 120.

The temperatures at which the polymerization reaction is carried out are those of the prior art and depend upon the type of monoalkylethylene reactant employed. In general, the temperatures at which maximum values of thickening power of polymer product are obtained increase with increasing carbon-atom content of the monoalkylethylene reactant. Also, and contrary to general belief, the viscosity and the molecular weight, and, consequently, the thickening power of the polymer products, obtained from the process, do not increase indefinitely with decreasing temperature of reaction, but increase only up to a certain value, after which, they decrease with decreasing temperature.

In accordance with the foregoing, it has been found that when propylene is the monoalkylethylene reactant, the temperatures to be used vary between about $+30°$ C. and about $-80.$ C., preferably, between about $-10°$ C. and about $-60°$ C. When butene-1 is used as the monoalkylethylene reactant, the temperatures vary between about $-10°$ C. and about $-45°$ C., preferably, between about $-20°$ C. and about $-40°$ C.

It will be obvious to those skilled in the art that, in order to obtain a polymer product having a desired specified thickening power, it will be necessary to select and correlate the reaction variables discussed hereinbefore, within the limits of the range of variation set forth. Thus for example when relatively high thickening powers are desired the most preferred reaction conditions will be selected. When lower thickening powers are desired the most favorable values for two or more of the reaction conditions will be selected with less favorable values for the remaining variables being selected. This selection and correlation is well within the skill of those familiar with the art.

There is nothing critical in the pressures to be used in the process. In general, the pressure should be sufficient to maintain the diluent and the catalyst solvent in the liquid phase at the temperature of operation. The monoalkylethylene reactant may be introduced into the reactor either in the gaseous phase or in the liquid phase.

The process may be carried out by any of the well known techniques of the prior art for effecting olefin polymerization. It can be carried out either as a batch operation or as a continuous operation. In the former, a known amount of aluminum bromohalide catalyst dissolved in a non-polymerizable hydrocarbon solvent and the proper amount of halide promoter are first placed in a reactor, and thereafter, the monoalkylethylene is introduced into the reactor at a rate falling within the range of variation specified hereinbefore. In continuous operation, the monoalkylethylene, the aluminum bromohalide catalyst-solvent mixture, and the proper amount of halide promoter, either in admixture with the monoalkylethylene or as a separate stream, are introduced simultaneously into the reactor while a stream of reaction mixture is removed continuously therefrom. Accordingly, the proper adjustment of the rates of flow of the respective streams will result in addition of the monoalkylethylene reactant to the reactor at the required rate with respect to the amount of aluminum bromohalide catalyst present in the reaction zone.

In the practice of the present invention, it is preferred to cool the olefin stream to the desired reaction temperature prior to its introduction into the reactor. The polymerization is an exothermic reaction, and the reaction mixture may be maintained at the desired temperature by means of external heat exchangers as, for example, by employing a jacketed reactor or heat-exchange coils within the reactor through which suitable refrigerants can be passed. If desired, evaporative cooling can be employed.

Following polymerization, the reactor effluent is treated by any suitable procedure for the removal of dissolved catalyst and promoter, and of catalyst tar, if tar is present. The last, if present, can be removed by settling. The catalyst and promoter present in the reactor effluent are inactivated by treating the effluent with water, alkali or alcohol and the reaction products of the inactivation treatment are removed by washing or other suitable means. In order to remove the solvent, the diluent and any light hydrocarbon or polymer products, the effluent is subjected to fractionation, steam distillation, gas stripping or other suitable treatment. When fractionation is utilized, low pressure is used to obtain effective separation, high temperatures being conducive to cracking of desired polymer product. For this purpose, temperatures below 350° C. are used while the pressure is gradually decreased, as the fractionation proceeds, down to about one millimeter of mercury at the end of the operation. However, effective separation of light polymer products may be effected by heating and flushing with an inert gas such as nitrogen. Residual promoter will be removed during the fractionation or other operations employed for the removal of diluent, solvent or light hydrocarbon reaction products.

When the polymer products are intended for use in mineral lubricating oils, a mineral lubricating oil can be admixed with the effluent from the reactor prior to removal of diluent and solvent. This will facilitate the handling of an otherwise highly viscous reaction product.

At the present time, the reaction mechanism involved in the process of the present invention is not fully understood. From a theoretical standpoint, it can be postulated, at least in the case when propylene is the monoalkylethylene reactant, that only two bromine atoms are involved in the polymerization mechanism, one being associated with the secondary carbonium-polymer ion and the other with the central carbon atom of the entering propylene molecule. The fact that only two bromine atoms are required in the aluminum bromohalide catalyst-halide promoter system appears to support this postulate.

Figure 1:
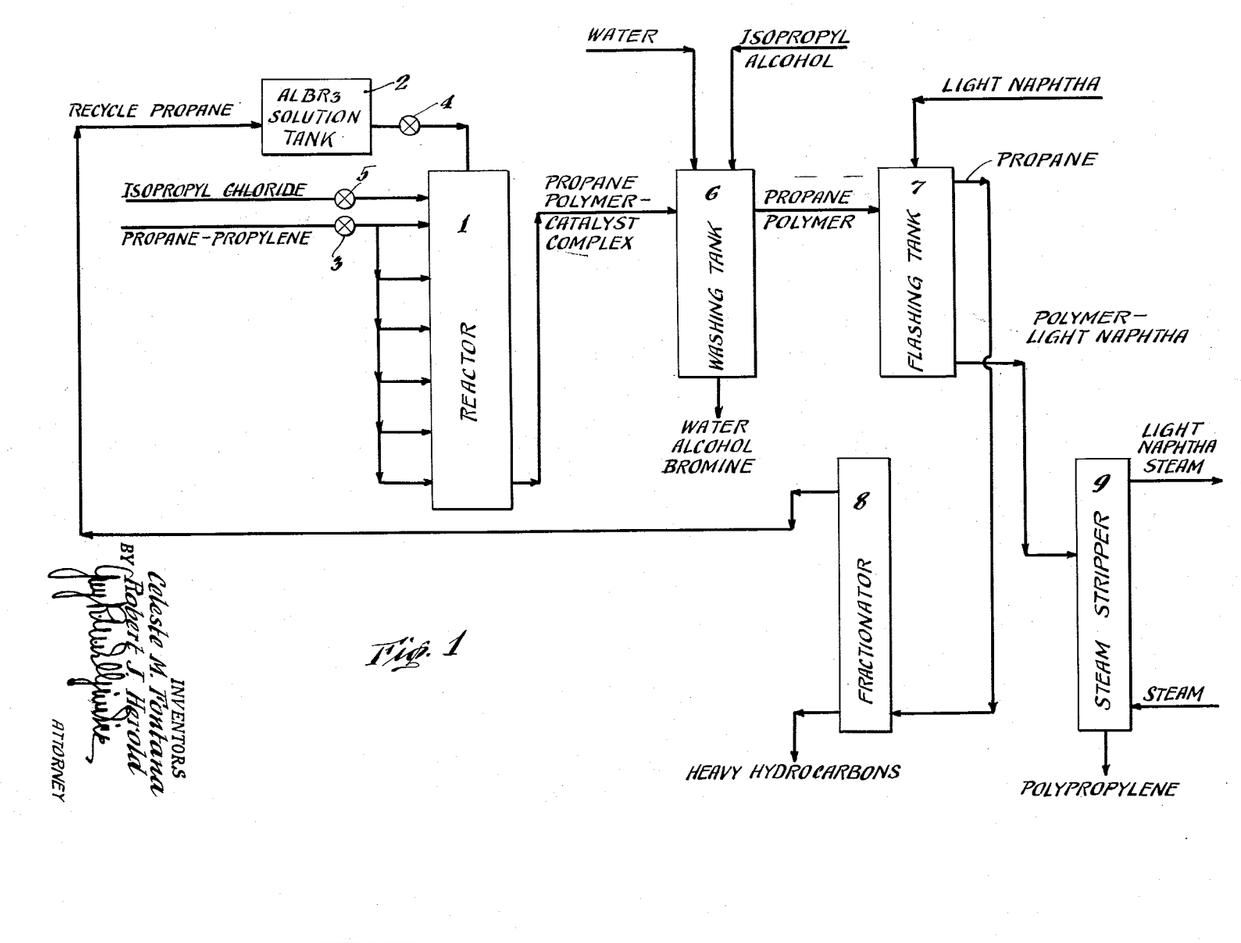
Figure 1 is a schematic illustration of a plant for practicing the process contemplated herein.

It will be apparent to those skilled in the art that the process described herein may be carried out in accordance with several procedures, all of which, nevertheless are encompassed by the broad statement of invention set forth hereinbefore. By way of illustration, a preferred specific embodiment may be practiced as follows, using propylene as the monoalkylethylene reactant, propane as the diluent and solvent, aluminum bromide as the catalyst, and isopropyl chloride as the promoter: Referring to Fig. 1, propane-propylene feed is introduced into a reactor 1. Aluminum bromide catalyst-propane mixture is introduced into the reactor 1, from a reservoir 2. Isopropyl chloride promoter is also introduced in the reactor 1 and the rate of introduction of propane-propylene feed, of aluminum bromide catalyst-propane mixture and of isopropyl chloride is controlled by means of valves 3, 4 and 5, respectively, to maintain the necessary molar ratios discussed hereinbefore. The reactor effluent comprising a mixture of propane, propylene polymer, and catalyst-promoter complex is passed into a washing tank 6 wherein it is washed with water and isopropyl alcohol. The bottoms from the washing tank containing water, alcohol, bromine, and aluminum may be passed to a recovery system (not shown) for recovery of alcohol, bromine and water.

The polymer mixture is introduced into a flashing tank 7 wherein it is mixed with a light naphtha and heated to a temperature sufficiently high to remove the propane diluent-solvent. The overhead is passed into a fractionator 8 to free the propane from heavier hydrocarbons, particularly isobutane, and water and isopropyl alcohol, and thereafter, the propane is recycled to the tank 2. The propane-free polymer-light naphtha mixture is introduced into a steam stripper 9 to remove the light naphtha and from which polypropylene is recovered as the bottoms.

It will be obvious to those familiar with the art that this procedure is susceptible to various modifications. For example, the polymer products issuing as the bottoms from the steam stripper 9 may be steam-distilled, gas flushed, or otherwise treated for removal of any light polymer products. These and other modifications are possible, and they, as well as the necessary provision of apparatus, may be readily made by those skilled in the art.

Figure 2:
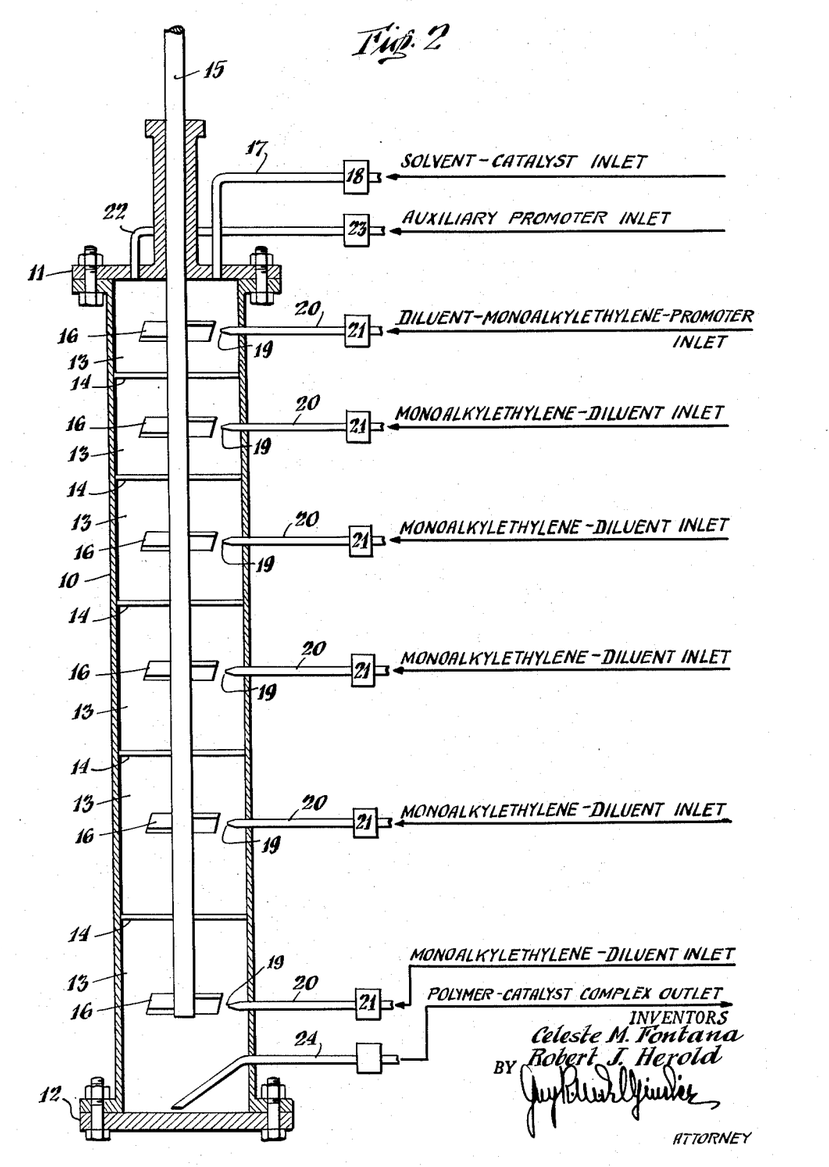
Figure 2 is a longitudinal and cross-sectional view of a reactor suitable for carrying out the polymerization reaction of the process.

As stated hereinbefore, it is essential, for the purposes of the present invention, to maintain the molar ratio of catalyst promoter, measured as hydrogen halide, to aluminum bromohalide catalyst, and the rate of addition of monoalkylethylene reactant with respect to the amount of aluminum bromohalide catalyst present in the reactor during the polymerization reaction, within certain limits. A reactor which has been found to be eminently suited for effecting this control is shown in Fig. 2. Such a reactor comprises an elongated chamber, suitably, a cylindrical pipe 10, sealed at both extremities 11 and 12. The chamber is divided, by a series of baffles 14, into a number of zones 13 which increase in volume from the catalyst-charging extremity 11 to the polymer-discharging extremity 12. Coaxially with the cylindrical pipe 10, there is mounted a rotatable shaft 15 onto which there are mounted impellers 16, one for each zone 13. The solvent-catalyst mixture is introduced into the reactor at the catalyst-charging extremity 11 through a pipe 17 and the rate of flow is controlled by means of a valve 18. The diluent-monoalkylethylene reactant mixture is introduced into the reactor in each zone 13 through nozzles 19 fed by pipes 20. The rate of flow through pipes 20 is controlled by means of valves 21. The catalyst promoter is conveniently introduced into the reactor in admixture with the diluent-monoalkylethylene reactant mixture. However, for the purpose of additionally controlling the molar ratio of catalyst promoter to aluminum bromohalide catalyst, the reactor is provided with an auxiliary promoter inlet pipe 22 and the rate of flow through this pipe is controlled by means of a valve 23. The polymer product and other reaction products are continuously removed from the bottom of the reactor through discharge pipe 24.

The following examples are for the purpose of illustrating modes of carrying out the process of the present invention and to point out the advantages thereof, it being understood that the invention is not to be considered as being limited to the specific monoalkylethylenes, aluminum bromohalide catalysts, halide promoters and solvents or to the manipulations, apparatus and conditions set forth therein. As it will be apparent to those skilled in the art, a wide variety of monoalkylethylenes, aluminum bromohalide catalysts, promoters and solvents and a diversity of schemes and conditions, as described hereinbefore, may be employed to carry out the polymerization reaction of the process.

EXAMPLES 1, 2 AND 3

Each of the following runs was carried out in accordance with the specific procedure and in the reactor both described hereinbefore. For convenience, the pertinent data of and the results obtained in each run are set forth in Table I.

EXAMPLES 4 AND 5

The runs of Examples 1 and 2 were repeated with the exception that, for purpose of comparison, the promoters were different. The pertinent data of and the results obtained are set forth in Table II.

A comparison of the results obtained in Examples 1 and 2 with those obtained in Examples 4 and 5, respectively, shows that the polymer products produced are similar in nature irrespective of the bromine-content of the catalyst promoter. On the other hand, when all the bromine atoms of the catalyst-promoter system are replaced by other halogen atoms, the polymer products obtained are entirely different. This is illustrated by the results obtained in the runs described in Examples 6–9.

EXAMPLES 6–9

The runs of these examples were carried out in a manner similar to those described for Examples 1, 2 and 3. The pertinent data of and the results obtained are set forth in Table III.

Table I

| Example No. | Catalyst | | | Promoter | | Monoalkylethylene | | | Temperature, °C. | TP$_{210}$ | RTP |
|---|---|---|---|---|---|---|---|---|---|---|---|
| | Composition | Solvent | Concentration [1] | Composition | Promoter to Catalyst, Mole Ratio | Composition | Rate of Addition [2] | Monoalkylethylene to Catalyst, Mole Ratio | | | |
| 1 | AlBr$_3$ | Propane | 0.50 | 1-C$_3$H$_7$Cl | 0.75 | Propylene | 0.67 | 60 | −44 | 7.54 | 0.963 |
| 2 | AlBr$_3$ | do | 0.50 | HCl | 0.75 | do | 0.67 | 100 | −44 | 6.20 | 0.92 |
| 3 | AlBr$_2$Cl | do | 0.25 | 1-C$_3$H$_7$Cl | 0.75 | do | 0.67 | 60 | −44 | 4.46 | 0.87 |

[1] In moles per 100 moles of solvent.
[2] In moles per mole of catalyst per minute.

Table II

| Example No. | Catalyst | | | Promoter | | Monoalkylethylene | | | Temperature, °C. | TP$_{210}$ | RTP |
|---|---|---|---|---|---|---|---|---|---|---|---|
| | Composition | Solvent | Concentration [1] | Composition | Promoter to Catalyst, Mole Ratio | Composition | Rate of Addition [2] | Monoalkylethylene to Catalyst, Mole Ratio | | | |
| 4 | AlBr$_3$ | Propane | 0.50 | 1-C$_3$H$_7$Br | 0.75 | Propylene | 0.67 | 80 | −44 | 7.76 | 0.928 |
| 5 | AlBr$_3$ | do | 0.50 | HBr | 0.75 | do | 0.67 | 110 | −44 | 6.54 | 0.915 |

[1] In moles per 100 moles of solvent.
[2] In moles per mole of catalyst per minute.

Table III

| Example No. | Catalyst | | | Promoter | | Monoalkylethylene | | Temperature, °C. | Estimated TP$_{210}$ |
|---|---|---|---|---|---|---|---|---|---|
| | Composition | Solvent | Concentration [1] | Composition | Promoter to Catalyst, Mole Ratio | Composition | Rate of addition [2] | | |
| 6 | AlCl$_3$ | CH$_3$CH$_2$Cl | 1.05 | | | Propylene | 0.193 | 0 | 0.5 |
| 7 | AlCl$_3$ | CH$_3$CH$_2$Cl | 1.05 | HCl | 1.44 | do | 0.198 | 0 | 0.6 |
| 8 | AlCl$_3$ | CH$_3$CH$_2$Cl | 2.02 | | | do | 0.207 | −78 | 2.4 |
| 9 | AlCl$_3$ | CH$_3$CH$_2$Cl | 2.04 | HCl | 1.48 | do | 0.208 | −78 | 1.7 |

[1] In moles per 100 moles of solvent.
[2] In moles per mole of catalyst per minute.

It will be seen that, in the absence of at least two bromine atoms present in the catalyst-promoter system, no products were obtained having a TP$_{210}$ higher than about 2.4. In addition, these products do not effect the improvement in the viscosity index of mineral lubricating oils achieved by the polymer products obtained in accordance with the runs described in Examples 1–5.

The runs set forth in Examples 10–18 are for the purpose of showing that olefins other than propylene and catalyst-promoter combinations other than aluminum bromide and aluminum dibromochloride with hydrogen chloride, hydrogen bromide and isopropyl chloride are operable in the process of the present invention.

EXAMPLES 10–18

The runs of these examples were carried out in a semi-batch manner, wherein the catalyst solution, promoter and monoalkylethylene were added continuously over indicated periods of time to precooled normal butane solvent. In each run, the catalyst was added as a one mole per cent solution in normal butane and the additional amount of normal butane solvent used was approximately four moles. The pertinent data of and the results obtained in each example are set forth in Table IV.

Table IV

| Example No. | Catalyst | | | Promoter | | | Monoalkylethylene | | | | Temperature, °C. | Results | |
|---|---|---|---|---|---|---|---|---|---|---|---|---|---|
| | Composition | Moles added | Period of Addition, Minutes | Composition | Moles Added | Period of Addition, Minutes | Composition | Moles Added | Period of Addition, Minutes | Feed Rate [1] | | TP$_{210}$ | RTP |
| 10 | AlBr$_3$ | 0.040 | 10 | HBr | 0.016 | 10 | Butene-1 | 2.16 | 62 | 0.90 | −30 | 14.3 | 0.99 |
| 11 | AlBr$_3$ | 0.041 | 16 | HCl | 0.018 | 16 | do | 1.51 | 80 | 0.46 | −35 | 14.2 | 1.01 |
| 12 | AlBr$_3$ | 0.044 | 15 | HI | 0.021 | 15 | do | 1.51 | 80 | 0.43 | −30 | 5.74 | 0.93 |
| 13 | AlBr$_3$ | 0.044 | 15 | C$_8$H$_{17}$F | 0.022 | [2] | do | 1.38 | 73 | 0.43 | −30 | 10.3 | 1.01 |
| 14 | AlBr$_3$ | 0.039 | 15 | HF | 0.007 | 15 | do | 2.33 | 123 | 0.48 | −32 | 3.04 | 0.80 |
| 15 | AlBr$_3$ | 0.041 | 16 | HCl | 0.017 | 16 | Octene-1 | 0.69 | 60 | 0.28 | −15 | 13.3 | 1.00 |
| 16 | AlBr$_3$ | 0.044 | 15 | C$_8$H$_{17}$F | 0.022 | [2] | do | 0.65 | 60 | 0.24 | −20 | 11.3 | 0.95 |
| 17 | AlBr$_2$I | 0.051 | 16 | HCl | 0.018 | 16 | Butene-1 | 1.65 | 87 | 0.37 | −30 | 3.02 | 0.80 |
| 18 | AlBr$_2$Cl | 0.038 | 15 | HCl | 0.021 | 15 | do | 1.51 | 80 | 0.50 | −30 | 9.10 | 0.94 |

[1] Moles of monoalkylethylene per mol of catalyst per minute.
[2] Added to diluent previous to the simultaneous addition of catalyst solution and olefin.

While the products of the present invention may be used for various purposes, they are especially useful as additives for mineral lubricating oils for the purpose of improving the viscosity indices thereof. To this end, they are blended with mineral lubricating oils in amounts varying between about 0.5% and about 5.0% based on the volume of the oil. They are compatible with other mineral lubricating oil addition agents, such as detergents, anti-oxidants, lubricity agents, and the like.

Although the present invention has been described in conjunction with preferred embodiments, it is to be understood that modifications and variations may be resorted to without departing from the spirit and scope thereof, as those skilled in the art will readily understand. Such variations and modifications are considered to be within the purview and scope of the appended claims.

What is claimed is:

1. A process for effecting the polymerization of monoalkylethylenes, which comprises contacting a monoalkylethylene with a hydrocarbon-soluble aluminum bromohalide catalyst dissolved in a nonpolymerizable hydrocarbon solvent, in a polymerization reaction zone, in the presence of a promoter selected from the group consisting of those represented by the formula HY, wherein Y is a halogen, and those represented by the formula RY, wherein R is an alkyl group containing at least three carbon atoms and Y is a halogen, said catalyst and said promoter being selected so that the catalyst-promoter system is represented by the formula $RAlX_{2-n}Br_{2+n}$, wherein R is hydrogen or an alkyl group containing at least three carbon atoms, X is a halogen other than bromine, and $n$ varies between 0 and less than 2, in proportions such that, during the course of the reaction in said polymerization reaction zone, the mole ratio of promoter, to dissolved aluminum bromohalide catalyst will fall within the range varying between about 0.2 and about 5.0, when the monoalkylethylene is propylene, and between about 0.05 and about 1.6, when the monoalkylethylene contains more than three carbon atoms per molecule, and the rate of addition of the monoalkylethylene will be not greater than about 2 moles when the monoalkylethylene is propylene, and not greater than about 4 moles, when the monoalkylethylene contains more than three carbon atoms per molecule, per mole of dissolved aluminum bromohalide catalyst per minute.

2. A process for effecting the polymerization of monoalkylethylenes, which comprises contacting a monoalkylethylene with a hydrocarbon-soluble aluminum bromohalide catalyst dissolved in a nonpolymerizable hydrocarbon solvent, in a polymerization reaction zone, in the presence of a promoter selected from the group consisting of those represented by the formula HY, wherein Y is a halogen, and those represented by the formula RY, wherein R is an alkyl group containing at least three carbon atoms and Y is a secondary halogen, said catalyst and said promoter being selected so that the catalyst-promoter system is represented by the formula $RAlX_{2-n}Br_{2+n}$, wherein R is hydrogen or an alkyl group containing at least three carbon atoms, X is a halogen other than bromine, and $n$ varies between 0 and less than 2, in proportions such that, during the course of the reaction in said polymerization reaction zone, the mole ratio of promoter to dissolved aluminum bromohalide catalyst will fall within the range varying between about 0.2 and about 5.0, when the monoalkylethylene is propylene, and between about 0.05 and about 1.6, when the monoalkylethylene contains more than three carbon atoms per molecule, the rate of addition of the monoalkylethylene will be not greater than about 2 moles, when the monoalkylethylene is propylene, and not greater than about 4 moles, when the monoalkylethylene contains more than three carbon atoms per molecule, per mole of dissolved aluminum bromohalide catalyst per minute, and the amount of the monoalkylethylene will fall within the range varying between about 10 moles and about 160 moles per mole of dissolved aluminum bromohalide catalyst.

3. A process for effecting the polymerization of propylene, which comprises contacting propylene with a hydrocarbon-soluble aluminum bromohalide catalyst dissolved in a nonpolymerizable hydrocarbon solvent, in a polymerization reaction zone, in the presence of a promoter selected from the group consisting of those represented by the formula HY, wherein Y is a halogen, and those represented by the formula RY, wherein R is an alkyl group containing at least three carbon atoms and Y is a secondary halogen, said catalyst and said promoter being selected so that the catalyst-promoter system is represented by the formula $$RAlX_{2-n}Br_{2+n}$$

wherein R is hydrogen or an alkyl group containing at least three carbon atoms, X is a halogen other than bromine, and $n$ varies between 0 and less than 2, in proportions such that, during the course of the reaction in said polymerization reaction zone, the mole ratio of promoter to dissolved aluminum bromohalide catalyst will fall within the range varying between about 0.5 and about 2.5, the rate of addition of propylene will be not greater than about one mole per mole of dissolved aluminum bromohalide catalyst per minute, and the amount of propylene will fall within the range varying between about 20 moles and about 120 moles per mole of dissolved aluminum bromohalide catalyst, and maintaining said polymerization reaction zone at a temperature falling within the range varying between about +30° C. and about −80° C.

4. A process for effecting the polymerization of a monoalkylethylene containing more than 3 carbon atoms per molecule, which comprises contacting said monoalkylethylene with a hydrocarbon-soluble aluminum bromohalide catalyst dissolved in a nonpolymerizable hydrocarbon solvent, in a polymerization reaction zone, in the presence of a promoter selected from the group consisting of those represented by the formula HY, wherein Y is a halogen, and those represented by the formula RY, wherein R is an alkyl group containing at least three carbon atoms and Y is a secondary halogen, said catalyst and said promoter being selected so that the catalyst-promoter system is represented by the formula $RAlX_{2-n}Br_{2+n}$, wherein R is hydrogen or an alkyl group containing at least three carbon atoms, X is a halogen other than bromine, and $n$ varies between 0 and less than 2, in proportions such that, during the course of the reaction in said polymerization reaction zone, the mole ratio of promoter to dissolved aluminum bromohalide catalyst will fall within the range varying between about 0.08 and about 1.2, the rate of addition of said monoalkylethylene will be not greater than about 2.5 moles per mole of dissolved aluminum bromohalide catalyst per minute, and the amount of said monoalkylethylene will fall within the range varying between about 20 moles and about 120 moles per mole of dissolved aluminum bromohalide catalyst, and maintaining said polymerization reaction zone at a temperature falling within the range varying between about −10° C. and about −45° C.

5. A process for effecting the polymerization of propylene, which comprises contacting propylene with an aluminum tribromide catalyst dissolved in a nonpolymerizable hydrocarbon solvent, in a polymerization reaction zone, in the presence of isopropyl chloride promoter, in proportions such that, during the course of the reaction in said polymerization reaction zone, the mole ratio of promoter to dissolved aluminum tribromide catalyst will fall within the range varying between about 0.5 and about 2.5, the rate of addition of propylene will be not greater than about one mole per mole of dissolved aluminum tribromide catalyst per minute, and the amount of propylene will fall within the range varying between about 20 moles and about 120 moles per mole of dissolved aluminum tribromide catalyst, and maintaining said polymerization reaction zone at a temperature falling within the range varying between about −10° C. and about −60° C.

6. A process for effecting the polymerization of propylene, which comprises contacting propylene with an aluminum tribromide catalyst dissolved in a non-polymerizable hydrocarbon solvent, in a polymerization reaction zone, in the presence of hydrogen chloride promoter, in proportions such that, during the course of the reaction in said polymerization reaction zone, the mole ratio of promoter to dissolved aluminum tribromide catalyst will fall within the range varying between about 0.5 and about 2.5, the rate of addition of propylene will be not greater than about one mole per mole of dissolved aluminum tribromide catalyst per minute, and the amount of propylene will fall within the range varying between about 20 moles and about 120 moles per mole of dissolved aluminum tribromide catalyst, and maintaining said polymerization reaction zone at a temperature falling within the range varying between about −10° C. and about −60° C.

7. A process for effecting the polymerization of butene-1, which comprises contacting butene-1 with an aluminum tribromide catalyst dissolved in a non-polymerizable hydrocarbon solvent, in a polymerization reaction zone, in the presence of hydrogen chloride promoter, in proportions such that, during the course of the reaction in said polymerization reaction zone, the mole ratio of promoter to dissolved aluminum tribromide catalyst will fall within the range varying between about 0.08 and about 1.2, the rate of addition of the butene-1 will be not greater than about 2.5 moles per mole of dissolved aluminum tribromide catalyst per minute, and the amount of the butene-1 will fall within the range varying between about 20 moles and about 120 moles per mole of dissolved aluminum tribromide catalyst, and maintaining said polymerization reaction zone at a temperature falling within the range varying between about −20° C. and about −40° C.

8. A process for effecting the polymerization of propylene, which comprises contacting propylene with an aluminum dibromochloride catalyst dissolved in a non-polymerizable hydrocarbon solvent, in a polymerization reaction zone, in the presence of isopropyl chloride promoter, in proportions such that, during the course of the reaction in said polymerization reaction zone, the mole ratio of promoter to dissolved aluminum dibromochloride catalyst will fall within the range varying between about 0.5 and about 2.5 the rate of addition of the propylene will be not greater than about one mole per mole of dissolved aluminum dibromochloride catalyst per minute, and the amount of the propylene will fall within the range varying between about 20 moles and about 120 moles per mole of dissolved aluminum dibromochloride catalyst, and maintaining said polymerization reaction zone at a temperature falling within the range varying between about −10° C. and about −60° C.

9. A process for effecting the polymerization of butene-1, which comprises contacting butene-1 with an aluminum dibromochloride catalyst dissolved in a nonpolymerizable hydrocarbon solvent, in a polymerization reaction zone, in the presence of hydrogen chloride promoter, in proportions such that, during the course of the reaction in said polymerization reaction zone, the mole ratio of promoter to dissolved aluminum dibromochloride catalyst will fall within the range varying between about 0.08 and about 1.2, the rate of addition of the butene-1 will be not greater than about 2.5 moles per mole of dissolved aluminum dibromochloride catalyst per minute, and the amount of the butene-1 will fall within the range varying between about 20 moles and about 120 moles per mole of dissolved aluminum dibromochloride catalyst, and maintaining said polymerization reaction zone at a temperature falling within the range varying between about −20° C. and about −40° C.

10. A polymer of a monoalkylethylene obtained by the process which comprises contacting a monoalkylethylene with a hydrocarbon-soluble aluminum bromohalide catalyst dissolved in a non-polymerizable hydrocarbon solvent, in a polymerization reaction zone, in the presence of a promoter selected from the group consisting of those represented by the formula HY, wherein Y is a halogen and those represented by the formula RY, wherein R is an alkyl group containing at least three carbon atoms and Y is a halogen, said catalyst and said promoter being selected so that the catalyst-promotor system is represented by the formula $RAlX_{2-n}Br_{2+n}$, wherein R is hydrogen or an alkyl group containing at least three carbon atoms, X is a halogen other than bromine, and $n$ varies between 0 and less than 2, in proportions such that, during the course of the reaction in said polymerization reaction zone, the mole ratio of promoter to dissolved aluminum bromohalide catalyst will fall within the range varying between about 0.2 and about 5.0, when the monoalkylethylene is propylene, and between about 0.05 and about 1.6, when the monoalkylethylene contains more than three carbon atoms per molecule, and the rate of addition of the monoalkylethylene will not be greater than about 2 moles, when the monoalkylethylene is propylene, and not gerater than about 4 moles, when the monoalkylethylene contains more than three carbon atoms per molecule, per mole of dissolved aluminum bromohalide catalyst per minute.

11. A polymer of a monoalkylethylene obtained by the process which comprises contacting a monoalkylethylene with a hydrocarbon-soluble aluminum bromohalide catalyst dissolved in a non-polymerizable hydrocarbon solvent, in a polymerization reaction zone, in the presence of a promoter selected from the group consisting of those represented by the formula HY, wherein Y is a halogen, and those represented by the formula RY, wherein R is an alkyl group containing at least three carbon atoms and Y is a secondary halogen, said catalyst and said promoter being selected so that the catalyst-promoter system is represented by the formula $RAlX_{2-n}Br_{2+n}$, wherein R is hydrogen or an alkyl group containing at lease three carbon atoms, X is a halogen other than bromine, and $n$ varies between 0 and less than 2, in proportions such that, during the course of the reaction in said polymerization reaction zone, the mole ratio of promoter to dissolved aluminum bromohalide catalyst will fall within the range varying between about 0.2 and about 5.0, when the monoalkylethylene is propylene, and between about 0.5 and about 1.6, when the monoalkylethylene contains more than three carbon atoms per molecule, the rate of addition of the monoalkylethylene will not be greater than about 2 moles, when the monoalkylethylene is propylene, and not greater than 4 moles, when the monoalkylethylene contains more than three carbon atoms per molecule, per mole of dissolved aluminum bromohalide catalyst per minute, and the amount of the monoalkylethylene will fall within the range varying between about 10 moles and about 160 moles per mole of dissolved aluminum bromohalide catalyst.

12. A polymer of propylene obtain by the process which comprises contacting propylene with a hydrocarbon-soluble aluminum bromohalide catalyst dissolved in a nonpolymerizable hydrocarbon solvent, in a polymerization reaction zone, in the presence of a promoter selected from the group consisting of those represented by the formula HY, wherein Y is a halogen, and those represented by the formula RY, wherein R is an alkyl group containing at least three carbon atoms and Y is a secondary halogen, said catalyst and said promoter being selected so that the catalyst-promoter system is represented by the formula $RAlX_{2-n}Br_{2+n}$, wherein R is hydrogen or an alkyl group containing at least three carbon atoms, X is a halogen other than bromine, and $n$ varies between 0 and less than 2, in proportions such that, during the course of the reaction in said polymerization reaction zone, the mole ratio of promoter to dissolved aluminum bromohalide catalyst will fall within the range varying between about 0.5 and about 2.5, the rate of addition of propylene will not be greater than about one mole per mole of dissolved aluminum bromohalide catalyst per minute, and the amount of propylene will fall within the range varying between about 20 moles and about 120 moles per mole of dissolved aluminum bromohalide catalyst, and maintaining said polymerization reaction zone at a temperature falling within the range varying between about +30° C and about −80° C.

13. A polymer of a monoalkylethylene containing more than three carbon atoms per molecule, obtained by the process which comprises contacting said monoalkylethylene with a hydrocarbon-soluble aluminum bromohalide catalyst dissolved in a nonpolymerizable hydrocarbon solvent, in a polymerization reaction zone, in the presence of a promoter selected from the group consisting of those represented by the formula HY, wherein Y is a halogen, and those represented by the formula RY, wherein R is an alkyl group containing at least three carbon atoms and Y is a secondary halogen, said catalyst and said promoter being selected so that the catalyst-promoter system is represented by the formula $RAlX_{2-n}Br_{2+n}$, wherein R is hydrogen or an alkyl group containing at least three carbon atoms, X is a halogen other than bromine, and $n$ varies between 0 and less than 2, in proportions such that, during the course of the reaction in said polymerization reaction zone, the mole ratio of promoter to dissolved aluminum bromohalide catalyst will fall within the range varying between about 0.08 and about 1.2, the rate of addition of said monoalkylethylene will be not greater than about 2.5 moles per mole of dissolved aluminum bromohalide catalyst per minute, and the amount of said monoalkylethylene will fall within the range varying between about 20 moles and about 120 moles per mole of dissolved aluminum bromohalide catalyst, and maintaining said polymerization reaction zone at a temperature falling within the range varying between about −10° C. and about −45° C.

14. A polymer of propylene obtained by the process which comprises contacting propylene with an aluminum tribromide catalyst dissolved in a non-polymerizable hydrocarbon solvent, in a polymerization reaction zone, in the presence of isopropyl chloride promoter, in proportions such that, during the course of the reaction in said polymerization reaction zone, the mole ratio of promoter to dissolved aluminum tribromide catalyst will fall within the range varying between about 0.5 and about 2.5, the rate of addition of propylene will be not greater than about one mole per mole of dissolved aluminum tribromide catalyst per minute, and the amount of propylene will fall within the range varying between about 20 moles and about 120 moles per mole of dissolved aluminum tribromide catalyst, and maintaining said polymerization reaction zone at a temperature falling within the range varying between about −10° C. and about −60° C.

15. A polymer of propylene obtained by the process which comprises contacting propylene with an aluminum tribromide catalyst dissolved in a non-polymerizable hydrocarbon solvent, in a polymerization reaction zone, in the presence of hydrogen chloride promoter, in proportions such that, during the course of the reaction in said polymerization reaction zone, the mole ratio of promoter to dissolved aluminum tribromide catalyst will fall within the range varying between about 0.5 and about 2.5, the rate of addition of propylene will be not greater than about one mole per mole of dissolved aluminum tribromide catalyst per minute, and the amount of propylene will fall within the range varying between about 20 moles and about 120 moles per mole of dissolved aluminum tribromide catalyst, and maintaining said polymerization reaction zone at a temperature falling within the range varying between about −10° C. and about −60° C.

16. A polymer of butene-1 obtained by the process which comprises contacting butene-1 with an aluminum tribromide catalyst dissolved in a non-polymerizable hydrocarbon solvent, in a polymerization reaction zone, in the presence of hydrogen chloride promoter, in proportions such that, during the course of the reaction in said polymerization reaction zone, the mole ratio of promoter to dissolved aluminum tribromide catalyst will fall within the range varying between about 0.08 and about 1.2, the rate of addition of the butene-1 will be not greater than about 2.5 moles per mole of dissolved aluminum tribromide catalyst per minute, and the amount of the butene-1 will fall within the range varying between about 20 moles and about 120 moles per mole of dissolved aluminum tribromide catalyst, and maintaining said polymerization reaction zone at a temperature falling within the range varying between about −20° C. and about −40° C.

17. A polymer of propylene obtained by the process which comprises contacting propylene with an aluminum dibromochloride catalyst dissolved in a non-polymerizable hydrocarbon solvent, in a polymerization reaction zone, in the presence of isopropyl chloride promoter, in proportions such that, during the course of the reaction in said polymerization reaction zone, the mole ratio of promoter to dissolved aluminum dibromochloride catalyst will fall within the range varying between about 0.5 and about 2.5, the rate of addition of the propylene will be not greater than about one mole per mole of dissolved aluminum dibromochloride catalyst per minute, and the amount of the propylene will fall within the range varying between about 20 moles and about 120 moles per mole of dissolved aluminum dibromochloride catalyst, and maintaining said polymerization reaction zone at a temperature falling within the range varying between about −10° C. and about −60° C.

18. A polymer of butene-1 obtained by the process which comprises contacting butene-1 with an aluminum dibromochloride catalyst dissolved in a non-polymerizable hydrocarbon solvent, in a polymerization reaction zone, in the presence of hydrogen chloride promoter, in proportions such that, during the course of the reaction in said polymerization reaction zone, the mole ratio of promoter to dissolved aluminum dibromochloride catalyst will fall within the range varying between about 0.08 and about 1.2, the rate of addition of the butene-1 will be not greater than about 2.5 moles per mole of dissolved aluminum dibromochloride catalyst per minute, and the amount of the butene-1 will fall within the range varying between about 20 moles and about 120 moles per mole of dissolved aluminum dibromochloride catalyst, and maintaining said polymerization reaction zone at a temperature falling within the range varying between about −20° C. and about −40° C.

References Cited in the file of this patent

UNITED STATES PATENTS

| Number | Name | Date |
|---|---|---|
| 2,286,129 | Veltman | June 9, 1942 |
| 2,519,034 | Elmore et al. | Aug. 15, 1950 |
| 2,521,939 | Oriolo | Sept. 12, 1950 |
| 2,525,787 | Fontana et al. | Oct. 17, 1950 |
| 2,571,354 | Fontana | Oct. 16, 1951 |